United States Patent [19]

Roybal

[11] 3,851,854

[45] Dec. 3, 1974

[54] CONSTRUCTION ROBOT
[76] Inventor: Frank V. Roybal, Rt. 3, Box 125 A, Montrose, Colo. 81401
[22] Filed: July 5, 1973
[21] Appl. No.: 376,921

[52] U.S. Cl............... 254/7 C, 182/141, 214/1 SW
[51] Int. Cl............................................... B60p 1/10
[58] Field of Search....... 254/7 R, 7 C, 45; 182/141; 214/1 S, 1 SW

[56] References Cited
UNITED STATES PATENTS
2,140,617  12/1938  Castady .............................. 182/141
2,681,454  6/1954  Tallman .............................. 254/7 R
3,415,490  12/1968  Steele ................................... 254/45

Primary Examiner—Al Lawrence Smith
Assistant Examiner—Robert C. Watson
Attorney, Agent, or Firm—Jack C. Sloan

[57] ABSTRACT

An apparatus comprising a vertically easily adjustable scaffold for use by construction workers of all type, and which is particularly for installation of gypsum board ceilings by eliminating an extra man in aiding to raise and hold up the board; the device consisting of a stationary base frame that supports a vertically movable frame, and a motor that rotates turn-buckle type units so to raise or lower the movable frame.

3 Claims, 2 Drawing Figures

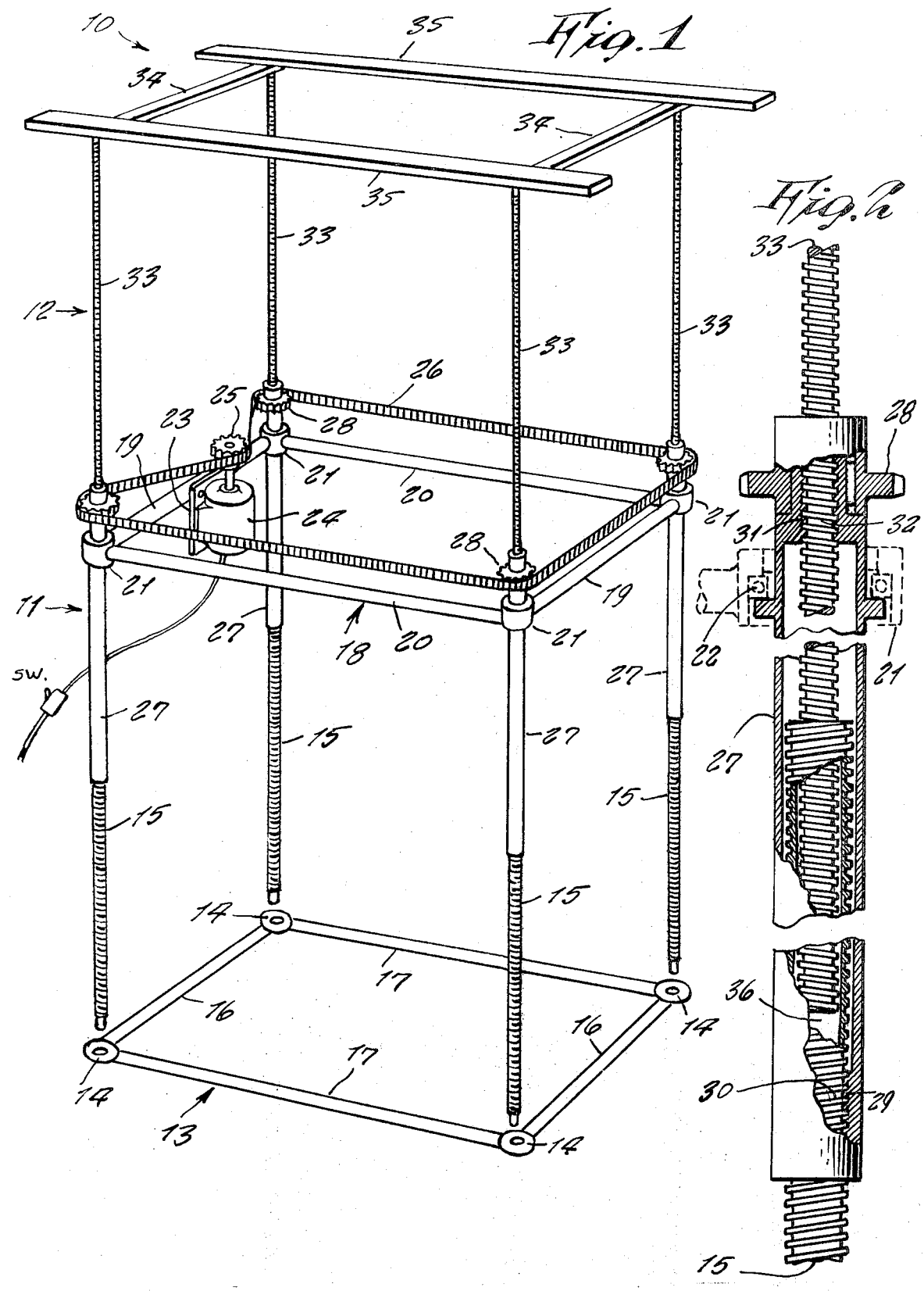

CONSTRUCTION ROBOT

This invention relates generally to construction equipment.

A principal object of the present invention is to provide a scaffold which is self-raising so to eliminate the labor of manually lifting and lowering of materials at a construction job, and which can be built on a scale whereby it can be moved about within a room so that it would be particularly adaptable in aiding the installation of gypsum board ceilings by eliminating the need of an extra man.

Another object is to provide a construction robot which will easily and gently raise cumbersome large and heavy gypsum boards and then accurately position them without effort and hold them while they are then secured to the ceiling joists.

Another object is to provide a construction robot which can be used by painters, bricklayers, roofers and others to raise or lower materials to scaffolding up to approximately eight feet high.

Yet another object is to provide a construction robot which when downwardly retracted, can serve as a work table.

Other objects are to provide a construction robot which is simple in design, inexpensive to manufacture, rugged in construction, easy to use, and efficient in operation.

These and other objects will be readily evident upon a study of the following specification and the accompanying drawing, wherein:

FIG. 1 is a perspective view of the invention shown in extended position.

FIG. 2 is an enlarged, fragmentary cross-sectional view of one of the telescopic leg assemblies.

Reference is now made to the drawing in detail, wherein the numeral 10 represents a construction robot according to the present invention, and which consists of a stationary frame 11 that supports a vertically adjustable frame 12 thereupon.

The stationary frame 11 is detachably placed upon a base 13 which may be mounted upon castor wheels so that it can be adjustably rolled upon a floor. The base has corner sockets 14 so to receive the lower ends of legs 15 of the frame 11. The sockets are at the corners of rigidly interconnected bars 16 and 17.

The frame 11 includes a rigid framework 18 of bars 19 and 20 which at the corners has sockets 21 fitted with bushings and thrust bearings 22. A plate 23 secured to the framework supports a reversible electric motor 24 having a sprocket 25 for driving an endless chain 26. The stationary frame 11 also includes a rotatable sleeve 27 fitted through each socket 21, the sleeve 27 having a sprocket 28 ridigly keyed thereto, the sprocket 28 engaging the chain 26. The lower end of the sleeve has an internal screw thread 29 that engages external screw thread 30 around the leg member 15. The upper end of the sleeve has an internal screw thread 31 that engages external screw thread 32 of each leg 33 of the vertically movable frame 12. It is to be noted that the threads 29 at one end of the sleeve are left hand while the thread 31 at the sleeve other end is right hand.

The frame 12 consists of the four legs 33 rigidly connected to cross bars 34 and longitudinal bars 35 that form a working deck on which gypsum boards or else a table top is placed.

In operative use, it is now evident that when the motor is turned on, the chain is caused to travel thus rotate the sprockets 28 and the sleeves 27, which due to having a right handed and left handed thread at opposite ends causes the legs 15 and 33 to axially become either spread further apart or closer together, depending upon which direction the motor is operated, thus resulting in the movable frame to either lift or lower.

As shown in FIG. 2, the legs 15 are hollow so to allow the legs 33 to extend into the opening 36, thus allowing the legs to telescope together when the device is in retracted position.

While the present invention is not limited to specific dimensions, the following sizes are only suggested for practical purposes. The base is 3 feet by 5 feet, so the device can readily be moved through a doorway. Legs 15 and 33 may be approximately 31 inches long and sleeves 27 being 35 inches long.

I claim:

1. An adjustable scaffold which comprises, in combination:
   a. A vertically adjustable working deck having externally threaded legs extending downward from the corners of said working deck,
   b. Rotatable sleeves, each having,
      1. an upper end internally threaded for engaging one of the externally threaded legs of the working deck,
      2. an exially hollow center section for receiving the leg of the working deck and for receiving a lower leg,
      3. a sprocket rigidly fixed to the rotatable sleeve and having teeth for engaging a drive chain,
      4. an externally protruding flange for supporting a thrust bearing which in turn supports a stationary frame socket fitting loosely around said rotatable sleeve,
      5. a lower end internally threaded in the opposite hand from the threads of the upper end of the rotatable sleeve, for engaging an externally threaded lower leg which extends downward to a base,
   c. a stationary frame having sockets at each corner, each stationary frame socket being provided with a downwardly directed opening which is sized and adapted to fit around the rotatable sleeve and to rest upon the thrust bearing which in turn rests upon the flange of the rotatable sleeve,
   d. lower legs, each having
      1. a axially hollow section for slidingly receiving a leg from the working deck thereby giving maximum vertical extensibility to the scaffold,
      2. external thread extending from the top of the lower leg to substantially the bottom of the lower leg, for engaging the threads of the lower end of the rotatable sleeve,
      3. a non-threaded lower tip of the lower leg for rotatable mounting in a base socket,
   e. a base having a base socket at each corner for receiving the rotatable lower tip of each lower leg,
   f. a drive chain, entrained around each sprocket of each rotatable sleeve in an endless array, such that drive chain actuation simultaneously turns each rotatable sleeve and hence cause simultaneous axial displacement of the working deck legs and the lower legs, g. means carried by said stationary frame to actuate said drive chain.

2. The adjustable scaffold of claim 1 wherein the means carried by the stationary frame to actuate the drive chain is a reversible motor.

3. The adjustable scaffold of claim 2 wherein the reversible motor is mounted in a vertical plane so that a horizontally mounted drive gear connected to a vertical drive shaft of said motor provides a biasing tension on, and directly drives the drive chain.

* * * * *